US012659508B2

(12) United States Patent
Zhang et al.

(10) Patent No.: US 12,659,508 B2
(45) Date of Patent: Jun. 16, 2026

(54) METHOD, DEVICE, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Kai Zhang, Los Angeles, CA (US); Li Zhang, Los Angeles, CA (US); Yuhuai Zhang, Beijing (CN); Junru Li, Beijing (CN); Siwei Ma, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 177 days.

(21) Appl. No.: 18/285,251

(22) PCT Filed: Apr. 1, 2022

(86) PCT No.: PCT/CN2022/084911
§ 371 (c)(1),
(2) Date: Sep. 30, 2023

(87) PCT Pub. No.: WO2022/206973
PCT Pub. Date: Oct. 6, 2022

(65) Prior Publication Data
US 2024/0179343 A1     May 30, 2024

(30) Foreign Application Priority Data

Apr. 2, 2021    (WO) ................ PCT/CN2021/085245

(51) Int. Cl.
*H04N 19/593*     (2014.01)
*H04N 19/159*     (2014.01)
*H04N 19/176*     (2014.01)

(52) U.S. Cl.
CPC ......... *H04N 19/593* (2014.11); *H04N 19/159* (2014.11); *H04N 19/176* (2014.11)

(58) Field of Classification Search
CPC ... H04N 19/593; H04N 19/159; H04N 19/176
(Continued)

(56) References Cited

U.S. PATENT DOCUMENTS

2006/0140496 A1     6/2006   Gandolph et al.

FOREIGN PATENT DOCUMENTS

| CN | 104683805 A | 6/2015 | |
| CN | 112543332 * | 3/2021 | ........... H04N 19/105 |

(Continued)

OTHER PUBLICATIONS

CN112543332 Machine Translation.*
International Search Report in PCT/CN2022/084911, mailed Jun. 29, 2022, 4 pages.

*Primary Examiner* — Nguyen T Truong
(74) *Attorney, Agent, or Firm* — Astute IP Law Group

(57) ABSTRACT

Embodiments of the present disclosure provide a solution for video processing. In some embodiments, a method for video processing is proposed, which comprises: reordering at least one intra string copy (ISC) reference string, the at least one ISC reference string matching with at least one string of a block of a video; reconstructing the block based on the reordered at least one ISC reference string; and performing a conversion between the reconstructed block and a bitstream of the video. The proposed method can advantageously improve the coding efficiency.

21 Claims, 8 Drawing Sheets

100

(58) Field of Classification Search
USPC ..................................................... 375/240.13
See application file for complete search history.

(56) References Cited

FOREIGN PATENT DOCUMENTS

| CN | 112543332 A | 3/2021 |
| CN | 112565767 A | 3/2021 |
| WO | 2015131323 A1 | 9/2015 |

* cited by examiner

100

| 1 | 1 | 1 | 1 | 1 | 1 | 1 | 2 |
|---|---|---|---|---|---|---|---|
| 3 | 3 | 3 | 2 | 2 | 2 | 2 | 2 |
| 3 | 3 | 3 | 3 | 3 | 3 | 3 | 4 |
| 5 | 5 | 5 | 4 | 4 | 4 | 4 | 4 |

| | | | | | | | |
|---|---|---|---|---|---|---|---|
| 1 | 1 | 1 | 1 | 1 | 1 | 1 | 2 |
| 3 | 3 | 3 | 2 | 2 | 2 | 2 | 2 |
| 3 | 3 | 3 | 3 | 3 | 3 | 3 | 4 |
| 5 | 5 | 5 | 4 | 4 | 4 | 4 | 4 |

*Horizontal flipping*

| | | | | | | | |
|---|---|---|---|---|---|---|---|
| 2 | 1 | 1 | 1 | 1 | 1 | 1 | 1 |
| 2 | 2 | 2 | 2 | 2 | 3 | 3 | 3 |
| 4 | 3 | 3 | 3 | 3 | 3 | 3 | 3 |
| 4 | 4 | 4 | 4 | 4 | 5 | 5 | 5 |

*Vertical flipping*

| | | | | | | | |
|---|---|---|---|---|---|---|---|
| 5 | 5 | 5 | 4 | 4 | 4 | 4 | 4 |
| 3 | 3 | 3 | 3 | 3 | 3 | 3 | 4 |
| 3 | 3 | 3 | 2 | 2 | 2 | 2 | 2 |
| 1 | 1 | 1 | 1 | 1 | 1 | 1 | 2 |

REORDER AT LEAST ONE ISC REFERENCE STRING, THE AT LEAST ONE ISC REFERENCE STRING MATCHING WITH AT LEAST ONE STRING OF A BLOCK OF A VIDEO

710

RECONSTRUCT THE BLOCK BASED ON THE REORDERED AT LEAST ONE ISC REFERENCE STRING

715

PERFORM A CONVERSION BETWEEN THE RECONSTRUCTED BLOCK AND A BITSTREAM OF THE VIDEO

900

METHOD, DEVICE, AND MEDIUM FOR VIDEO PROCESSING

CROSS-REFERENCE TO RELATED APPLICATIONS

This is a national stage application filed under 37 U.S.C. 371 based on International Patent Application No. PCT/CN2022/084911, filed Apr. 1, 2022, which claims priority to International Patent Application No. PCT/CN2021/085245 filed with the China National Intellectual Property Administration (CNIPA) on Apr. 2, 2021, the disclosures of which are incorporated herein by reference in its entirety their entireties.

FIELD

Embodiments of the present disclosure relates generally to video coding techniques, and more particularly, to intra string copy (ISC) with reordering.

BACKGROUND

An intra string copy (ISC) mode, also known as string matching (SM) or string prediction (SP), is an effective coding tool to improve performance of screen content coding (SCC). A string is a series of consecutive pixels arranged in a scanning order within a coding unit (CU). The basic operation of string prediction is to break a current CU into multiple strings of variable sizes and search for reference strings matching with the multiple strings one by one in a predetermined searching range. Symmetry can be observed in screen-content pictures even more often because many text characters and computer-generated graphics are symmetric. However, it is redundant to code a pattern and its symmetric pattern independently.

SUMMARY

Embodiments of the present disclosure provide a solution for video processing.

In a first aspect, a method for video processing is proposed. In the method, at least one ISC reference string is reordered. The at least one ISC reference string matches with at least one string of a block of a video. The block is reconstructed based on the reordered at least one ISC reference string. A conversion is performed between the reconstructed block and a bitstream of the video.

In a second aspect, another method for video processing is proposed. In the method, it is determined whether reordering of at least one ISC reference string is enabled for a video. The video is processed which includes a first indication whether the reordering of the at least one ISC reference string is enabled.

In a third aspect, an electronic device is proposed. The electronic device comprises a processing unit, and a memory coupled to the processing unit and having instructions stored thereon which, when executed by the processing unit, cause electronic device to perform a method in accordance with the first or second aspect of the present disclosure.

In a fourth aspect, a non-transitory computer-readable storage medium is proposed. The non-transitory computer-readable storage medium storing instructions that cause a processor to perform a method in accordance with the first or second aspect of the present disclosure.

In a fifth aspect, a non-transitory computer-readable recording medium is proposed. The non-transitory computer-readable recording medium storing a bitstream of a video which is generated by a method in accordance with the first or second aspect of the present disclosure, wherein the method is performed by a video processing apparatus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 6 illustrates an example of symmetric ISC;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
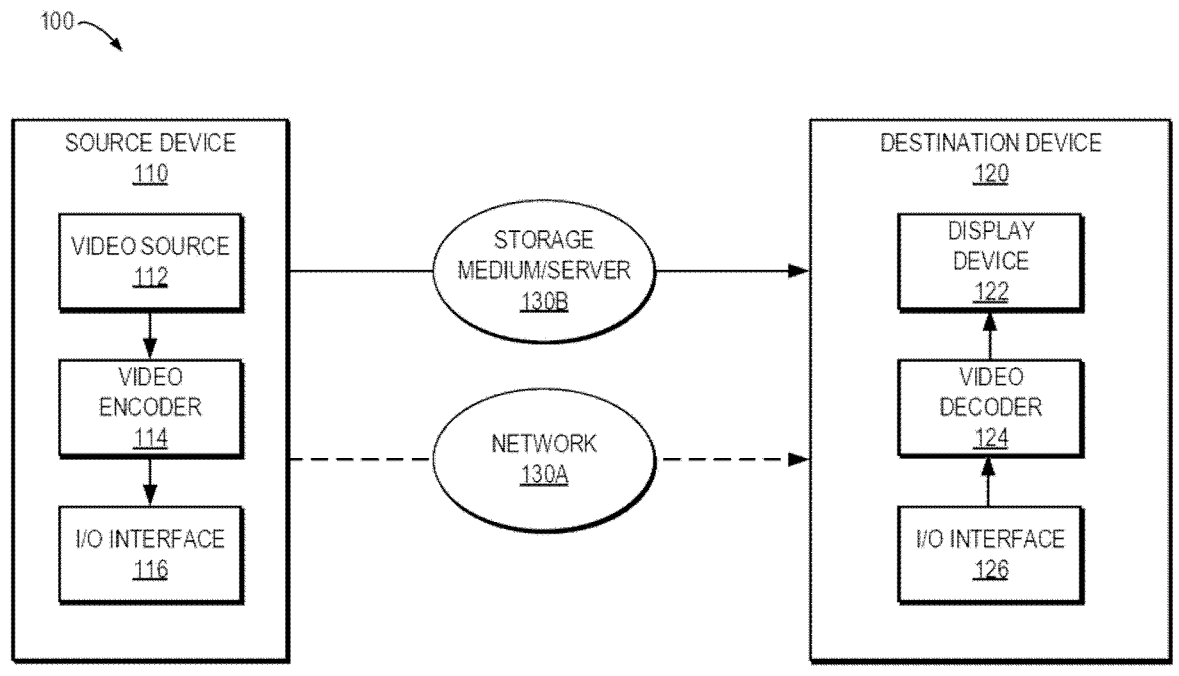
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
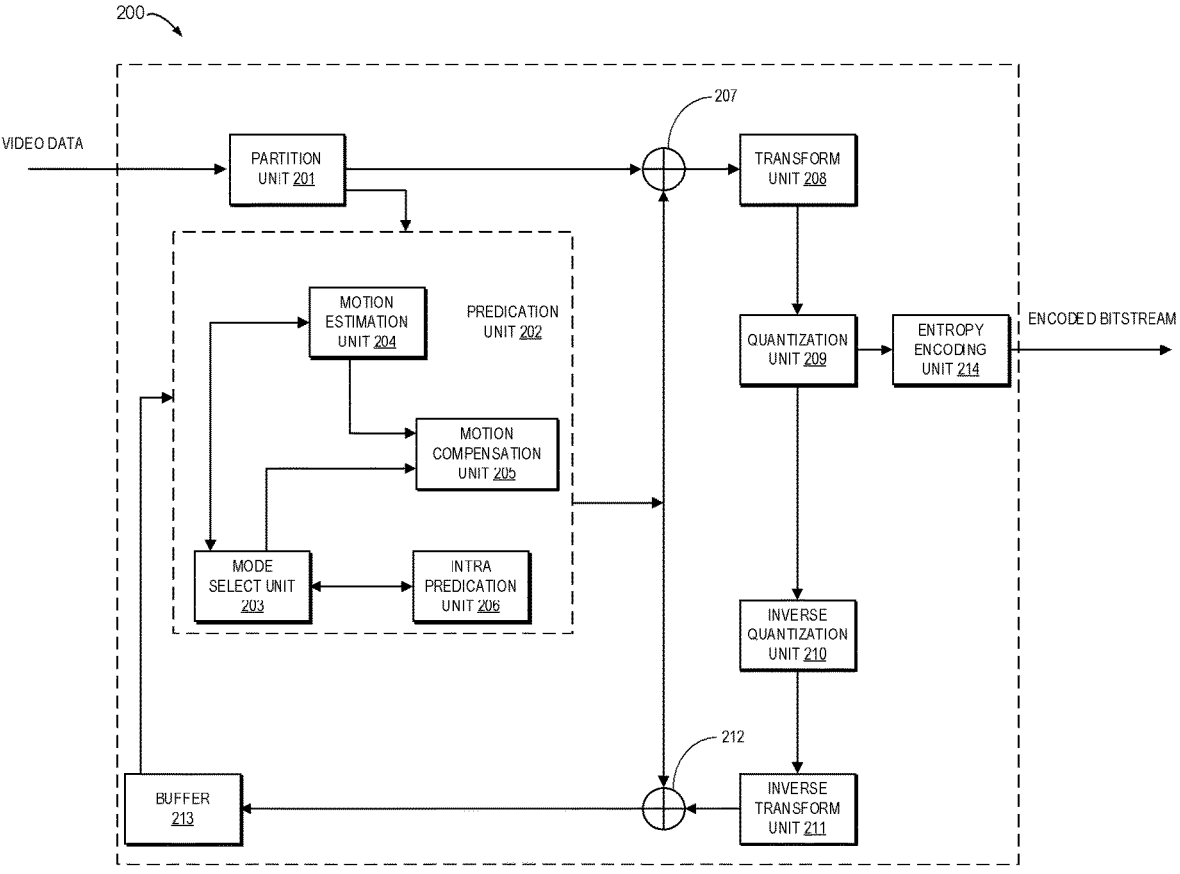
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
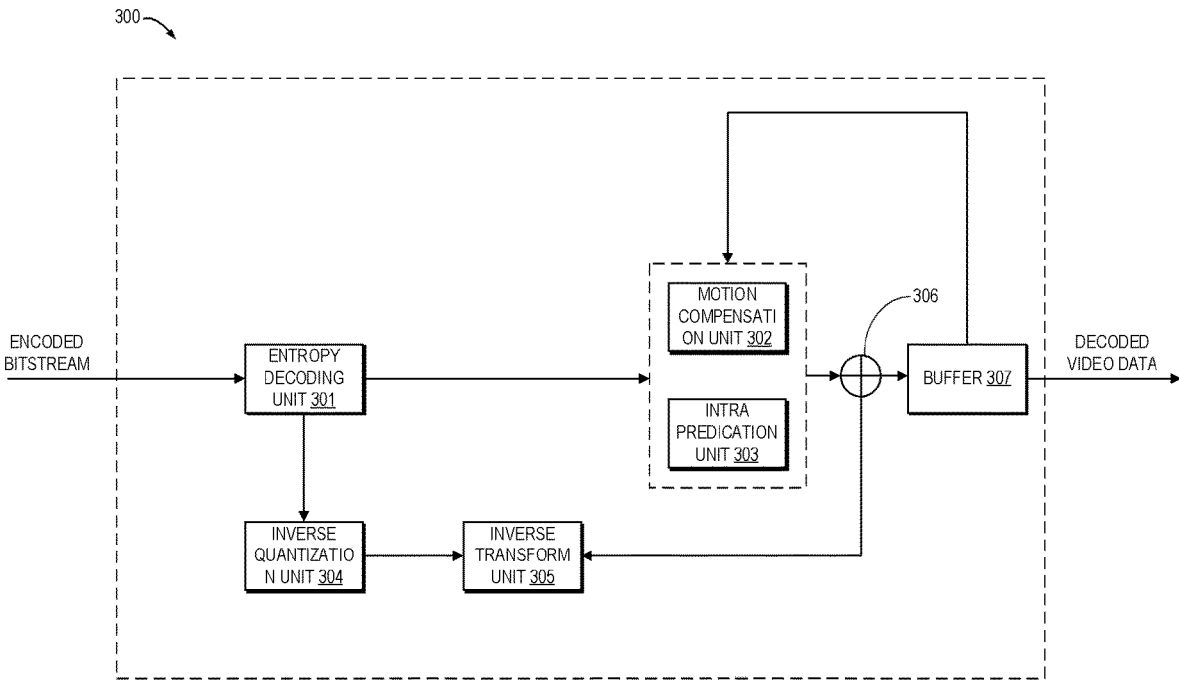
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is related to intra string copy in video coding. It may be applied to the existing video coding standard like HEVC, or the standard Versatile Video Coding (VVC). It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 8) could be found at:
http://phenix.it-sudparis.eu/jvet/doc_end_user/current_document.php?id=9675

The latest reference software of VVC, named VTM, could be found at:
https://vcgit.hhi.fraunhofer.de/jvet/VVCSoftware_VTM/tags/VTM-8.0

2.1 Coding Flow of a Typical Video Codec

Figures 4, 5:
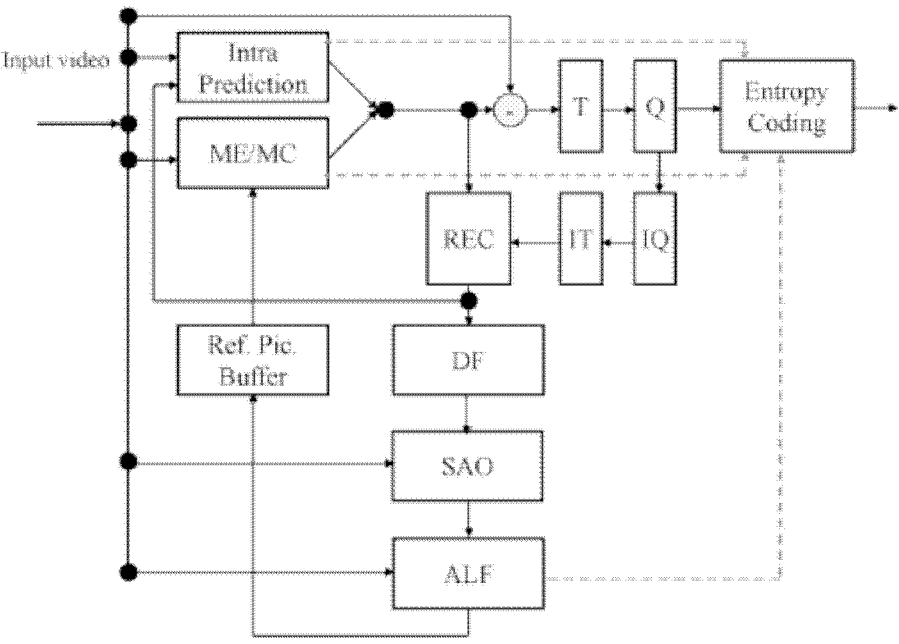
FIG. 4 illustrates an example of encoder block diagram.
FIG. 5 illustrates example string division of a current CU.

FIG. 4 shows an example of encoder block diagram of VVC, which contains three in-loop filtering blocks: deblocking filter (DF), sample adaptive offset (SAO) and adaptive looper filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2 Intra String Copy Mode

Intra string copy (ISC) mode, also known as string matching (SM) or string prediction (SP), is an effective coding tool to improve SCC performance. A string is a series of consecutive pixels arranged in a scanning order within a CU. String prediction divides a CU into multiple strings to take full advantage of matching patterns with a variety of sizes, shapes, and positions in screen content.

The basic operation of string prediction is to break a current CU being coded into multiple strings of variable size and search for best matching reference strings one by one in a predetermined searching range in the current reconstructed picture. There is neither transform nor quantization in string prediction coded CUs, and the optimal reference string selection process is simple. FIG. 5 shows an example of dividing a CU into five strings.

ISC has been adopted in AVS-3.

3. Problems

The current design of ISC has the following problems:
1. Symmetry can be observed in screen-content pictures even more often because many text characters and computer-generated graphics are symmetric. It is redundant to code a pattern and its symmetric pattern independently.

4. Detailed Descriptions

The detailed descriptions below should be considered as examples to explain general concepts. These descriptions should not be interpreted in a narrow way. Furthermore, these descriptions can be combined in any manner.

min(x, y) returns the smaller one of x and y.

The 'string' may be a series of consecutive pixels arranged in a scanning order within a transform unit (TU)/prediction unit (PU)/coding unit (CU)/transform block (TB)/prediction block (PB)/coding block (CB). The TU/PU/CU may include one or multiple color components, such as only luma component for the dual tree partitioning and current coded color component is luma; and two chroma components for the dual tree partitioning and current coded color component is chroma; or three color components for the single tree case.

In the following disclosure, W and H represents the width and height of a mentioned block.
1. It is proposed that the samples in a ISC reference string may be reordered, or rearranged, before being used to predict or reconstruct the current block. Such as method is called 'reordered ISC' (RISC).
   a. Suppose a string of the current block is denoted as P(i), and a reference string is denoted as S(i) with 0<=i<L, wherein S(i) is the sample value of the i-th sample in the reference string, P(i) is the sample value of the i-th sample in the string of the current block as a prediction or reconstruction value, and L is the length of the string. It is proposed that P(i)=S(f(i)) wherein f is 1-1 function, mapping a first index from 0 to L−1 to a second index from 0 to L−1. It is required that f cannot be an identical function. i.e., it is not allowed that f(i)=i for all i-s from 0 to L−1.
2. As an example of RISC, it is proposed that a ISC reference string may be flipped horizontally or vertically first before it is used to predict the current block. Such a method is called 'symmetric ISC' (SISC), as shown in FIG. 6.
3. Whether to and/or how to apply RISC/SISC to a first block may depend on color components and/or color formats of the first block.
   a. For example, RISC/SISC can be applied to a first component (such as luma) of the first block while normal intra prediction is always used for a second component (such as Cb or Cr) of the first block.
   b. For example, RISC/SISC can be applied to all color components of the first block.
4. Whether to and/or how to apply RISC/SISC to the first block may depend on the dimensions of the first block.
   a. RISC/SISC is applicable only if W>=T1 and H>=T2. E.g. T1=T2=4.
   b. RISC/SISC is applicable only if W<=T1 and H<=T2. E.g. T1=T2=32.
   c. RISC/SISC is applicable only if max(W, H)<=T1. E.g. T1=32.
   d. RISC/SISC is applicable only if min(W, H)>=T1. E.g. T1=4.
   e. RISC/SISC is applicable only if W*H>=T1. E.g. T1=16.
   f. RISC/SISC is applicable only if W*H<=T1. E.g. T1=1024.
   g. In the above bullets, ">=" may be replaced by ">" and "<=" may be replaced by "<".
5. Whether RISC/SISC can be applied may be signaled in a high level unit, such as in a Sequence Parameter Set (SPS)/a sequence header/Picture Parameter Set (PPS)/a picture header/a slice header.
   a. For example, a risc_enable_flag may be signaled in sequence header to indicate whether RISC can be applied for the sequence.
      i. risc_enable_flag may be signaled only if ISC is allowed to be used for the sequence (e.g. isc_enable_flag is equal to 1).
   b. For example, a sisc_enable_flag may be signaled in sequence header to indicate whether SISC can be applied for the sequence.
      i. sisc_enable_flag may be signaled only if ISC is allowed to be used for the sequence (e.g. isc_enable_flag is equal to 1).
6. The information of whether RISC/SISC is used (denoted as RISC_flag/SISC_flag) on a first block may be signaled conditionally.
   a. RISC_flag/SISC_flag is inferred to be a default value such as 0 if it is not present in the bitstream.
   b. RISC_flag/SISC_flag is signaled only if ISC is used for the first block.
   c. RISC_flag/SISC_flag is signaled only if RISC/SISC is allowed to be used which is indicated by the high level unit containing the first block.
   d. RISC_flag/SISC_flag is not signaled if it is determined that RISC/SISC is not applicable for the block.
   e. Whether to signal RISC_flag/SISC_flag may depend on the dimensions of the first block.
      i. RISC_flag/SISC_flag is signaled only if W>=T1 and H>=T2. E.g. T1=T2=4.
      ii. RISC_flag/SISC_flag is signaled only if W<=T1 and H<=T2. E.g. T1=T2=32.
      iii. RISC_flag/SISC_flag is signaled only if max(W, H)<=T1. E.g. T1=32.
      iv. RISC_flag/SISC_flag is signaled only if min(W, H)>=T1. E.g. T1=4.

v. RISC_flag/SISC_flag is signaled only if W*H>=T1. E.g. T1=16.

vi. RISC_flag/SISC_flag is signaled only if W*H<=T1. E.g. T1=1024.

vii. In the above bullets, ">=" may be replaced by ">" and "<=" may be replaced by "<".

7. At least a second syntax element (denoted as x_element) may be signaled after a first syntax element (denoted as RISC_flag) for a block. RISC_flag indicates whether RISC is applied for the block.

a. x_element may indicate the reordering method.

b. x_element is signaled conditioned by RISC_flag.

i. x_element is signaled only if RISC_flag indicates RISC is used.

c. x_element and/or RISC_flag may be coded by arithmetic coding.

i. x_element and/or RISC_flag may be bypass coded.

ii. x_element and/or RISC_flag may be coded with one or more contexts.

1) The contexts used to code RISC_flag of the current block may depend on RISC_flags of neighboring blocks.

2) The contexts used to code x_element of the current block may depend on x_element of neighboring blocks.

8. A second syntax element (denoted as sisc_dir_flag) may be signaled after a first syntax element (denoted as SISC_flag) for a block.

a. SISC_flag indicates whether SISC is applied for the block.

b. sisc_dir_flag indicates which kind of SISC is applied to all strings of the block. For example, sisc_dir_flag=0 means horizontal SISC is used and sisc_dir_flag=1 means vertical SISC is used.

c. sisc_dir_flag is signaled conditioned by SISC_flag.

i. sisc_dir_flag is signaled only if SISC_flag indicates SISC is used.

d. sisc_dir_flag and/or SISC_flag may be coded by arithmetic coding.

i. sisc_dir_flag and/or SISC_flag may be bypass coded.

ii. sisc_dir_flag and/or SISC_flag may be coded with one or more contexts.

1) The contexts used to code SISC_flag of the current block may depend on SISC_flags of neighboring blocks.

2) The contexts used to code sisc_dir_flag of the current block may depend on sisc_dir_flags of neighboring blocks.

e. If it is determined that only one kind of SISC is applicable, sisc_dir_flag is not signaled.

9. A set of syntax elements (denoted as sisc_str_flag) may be signaled after a first and a second syntax elements (denoted as SISC_flag and sisc_dir_flag) for a string in the current block.

a. sisc_str_flag is signaled conditioned by SISC_flag.

i. sisc_str_flag is signaled only if SISC_flag indicates SISC is used.

b. sisc_str_flag is signaled conditioned by isc_match_type.

i. sisc_str_flag is signaled only if isc_match_flag indicates current string is matched to a string of reconstruction pixels.

c. sisc_str_flag may be coded by arithmetic coding.

i. sisc_str_flag may be bypass coded.

ii. sisc_str_flag may be coded with one or more contexts.

1) The contexts used to code sisc_str_flag of the current block may depend on sisc_str_flags of neighboring blocks.

d. If it is determined that only one kind of SISC is applicable to all strings of the current block, sisc_str_flag is not signaled.

5. Embodiment

5.1 Coding Flow of a Typical Video Codec 7.1.2.2 Sequence Header

TABLE 14

Sequence Header Definition
Document modification 7,1,11

```
isc_ordinary_sp_coding_unit(x0,y0,width,height,component)
{
NumCodedPixel = 0
Num TotalPixel = width * height
i = 0
sisc_flag                                              ae(v)
if (SiscFlag)
{
sisc_dir_flag                                          ae(v)
}
while (NumCodedPixel < Num TotalPixel) {
...
if (IscMatchType[i] == 1) {
sisc_str_flag[i]                                       ae(v)
}
...
```

7.2.2.2 Sequence Header

Flip string copy intra prediction enable flag sisc_enable_flag

Binary variable. A value of 1' indicates that an intra prediction method can be copied using a flip string; A value of 0' indicates that the inversion string should not be used to duplicate the intra prediction method. The value of SiscEnableFlag is equal to sisc_enable_flag. If sisc_enable_flag does not exist in the bitstream, SiscEnableFlag has a value of 0.

7.2.6 Coding Unit

Flip String Copy Intra Mode Flag sisc_flag

Binary variable. A value of 1' indicates that the current coding unit is an inverted string copy intra prediction mode; A value of 0' indicates that the current coding unit is not in the inverted string copy intra prediction mode. To analyze course, see Error: Reference source not found. SiscFlag has a value equal to sisc_flag. If sisc_flag does not exist in the bitstream, the value of SiscFlag is equal to 0.

Flip String Copy Intra Prediction Direction Flag sisc_dir_flag

Binary variable. A value of 1' indicates that the current coding unit should copy intra prediction using a vertical flip string; A value of 0' indicates that the current coding unit should copy intra prediction using a horizontal flip string. To analyze course, see Error: Reference source not found. The value of SiscDirFlag is equal to sisc_dir_flag. If sisc_dir_flag does not exist in the bit stream, SiscDirFlag has a value of 0.

7.2.11 Intra Prediction of Serial Replication

Matching Type sisc_str_flag[i] for Intra Prediction of String Replication

To analyze course, see Error: Reference source not found. A value of 1' indicates that the matching string of the I part of the current coding unit needs to be flipped; A value of 0' means that the matching string of Part I does not need to be flipped. SiscStrFlag[i] is equal to the value of sisc_str_flag [i]. If sisc_str_flag[i] does not exist in the bit stream, the value of SISC_STRFLAG[I] is 0.

8.3.3.2.1 Derivation of Binary Symbol Model

TABLE 63 ctxIdxStart and ctxIdxInc Corresponding to Syntax Elements

| Grammatical element | ctxIdxInc | ctxIdxStart | The number of ctx |
|---|---|---|---|
| sisc_flag | 0 | 407 | 1 |
| sisc_dir_flag | 0 | 408 | 1 |
| isc_match_type | 0 | ~~407~~ 409 | 1 |
| sisc_str_flag | 0 | 410 | 1 |

Overview of 8.3.4.1

TABLE 65

Anti-binarization Methods for Syntax Elements

| Grammatical element | Inverse binarization method |
|---|---|
| ... | See Error: Reference source not found. |
| sisc_flag | See Error: Reference source not found, sisc_flag = synElVal |
| sisc_dir_flag | See Error: Reference source not found, sisc_dir_flag = synElVal |
| sisc_str_flag | See Error: Reference source not found, sisc_str_flag = synElVal |

9.7.3.2 Derived Prediction Samples of Common String Pattern

A) initialization.

```
NoOverlapStrNum = 1
RemainingStrLen = StrLen[i]
SymmStr = SiscFlag && SiscStrFlag
```

D) make k from 1 to 1~NoOverlapStrNum. For each K, make J from 0 to NOOVERLAPSTRLEN [K]-1, perform the following operations:

If the current prediction block is a luminance prediction block, the position of the upper left corner sample of the current prediction block in the luminance sample matrix of the current image is (xE,yE), and the current prediction unit part I string vector is Sv[i]. Do the following:

If IscMatchType[i] is equal to 1, or IscMatchType[i] is equal to 0 and PixelMatchTypeFlag[i][j] is equal to 1, the value of the luminance prediction sample matrix predMatrixIsc element predMatrixIsc[xj][yj] is the sample value of the position (xPos,yPos) in the entire pixel precision luminance sample matrix of the current image unfiltered reconstruction.

A) if SiscFlag has a value of 0 or SiscStrFlag has a value of 0.

$$xPos = xE + xj + Sv[i]\text{-}{>}x$$
$$yPos = yE + yj + Sv[i]\text{-}{>}y$$

B) otherwise, if SiscFlag has a value of 1 and SiscStrFlag has a value of 1 and SiscDirFlag has a value of 0.

$$xPos = xE + (CuWidth - xj - 1) + Sv[i]\text{-}{>}x$$
$$yPos = yE + yj + Sv[i]\text{-}{>}y$$

C) otherwise, if SiscFlag has a value of 1 and SiscStrFlag has a value of 1 and SiscDirFlag has a value of 1.

$$xPos = xE + xj + Sv[i]\text{-}{>}x$$
$$yPos = yE + (CuHeight - yj - 1) + Sv[i]\text{-}{>}y$$

Otherwise, if IsMatchType[I] is equal to 0 and PixelMatchTypeFlag[i][j] is equal to 0, predMatrixIsc[xj][yj] [YJ] is equal to the value of IsUnmatchedPrixely [I] of the current prediction unit.

If the current prediction block is a chrominance prediction block, and the values of xj&0x1 and yj&0x1 are both equal to 0, the position of the upper left corner sample of the luminance prediction block including the upper left corner sample of the current prediction block in the luminance sample matrix of the current image is (xE,yE), and the current prediction unit part I string vector is Sv[i]. Do the following:

If IscPixelMatchType[i][j] is equal to 1 and IscMatchType [i] is equal to 0, or IscMatchType[i] is equal to 1, the value of element predMatrixIsc [X][Y] of chrominance prediction sample matrix PREDMATRIXISC is the sample value of the position (xPos,yPos) in the whole pixel precision chrominance sample matrix of the current image unfiltered reconstruction.

A) if SiscFlag has a value of 0 or SiscStrFlag has a value of 0.

$$xPos = (xE + xj + Sv[i]\text{-}{>}x) >> 1$$
$$yPos = (yE + yj + Sv[i]\text{-}{>}y) >> 1$$

B) otherwise, if SiscFlag has a value of 1 and SiscStrFlag has a value of 1 and SiscDirFlag has a value of 0.

$$xPos = (xE + (CuWidth - xj - 1) + Sv[i]\text{-}{>}x) >> 1$$
$$yPos = (yE + yj + Sv[i]\text{-}{>}y) >> 1$$

C) otherwise, if SiscFlag has a value of 1 and SiscStrFlag has a value of 1 and SiscDirFlag has a value of 1.

$$xPos = (xE + xj + Sv[i]\text{-}{>}x) >> 1$$
$$yPos = (yE + (CuHeight - yj - 1) + Sv[i]\text{-}{>}y) >> 1$$

If IscMatchType[i] is equal to 0 and IscPixelMatchType [i][j] is equal to 0, the value of element predMatrixIsc [X][Y] of Cb component chroma prediction sample matrix PREDMATRIXISC is equal to the value of IscUnmatchedPixelCb[i][j] of the current prediction unit; The value of element predistrixisc [x][y] of Cr component chroma prediction sample matrix predistrixisc is equal to the value of IscUnmatchedPixelCr[i][j] of the current prediction unit.

Figure 7:
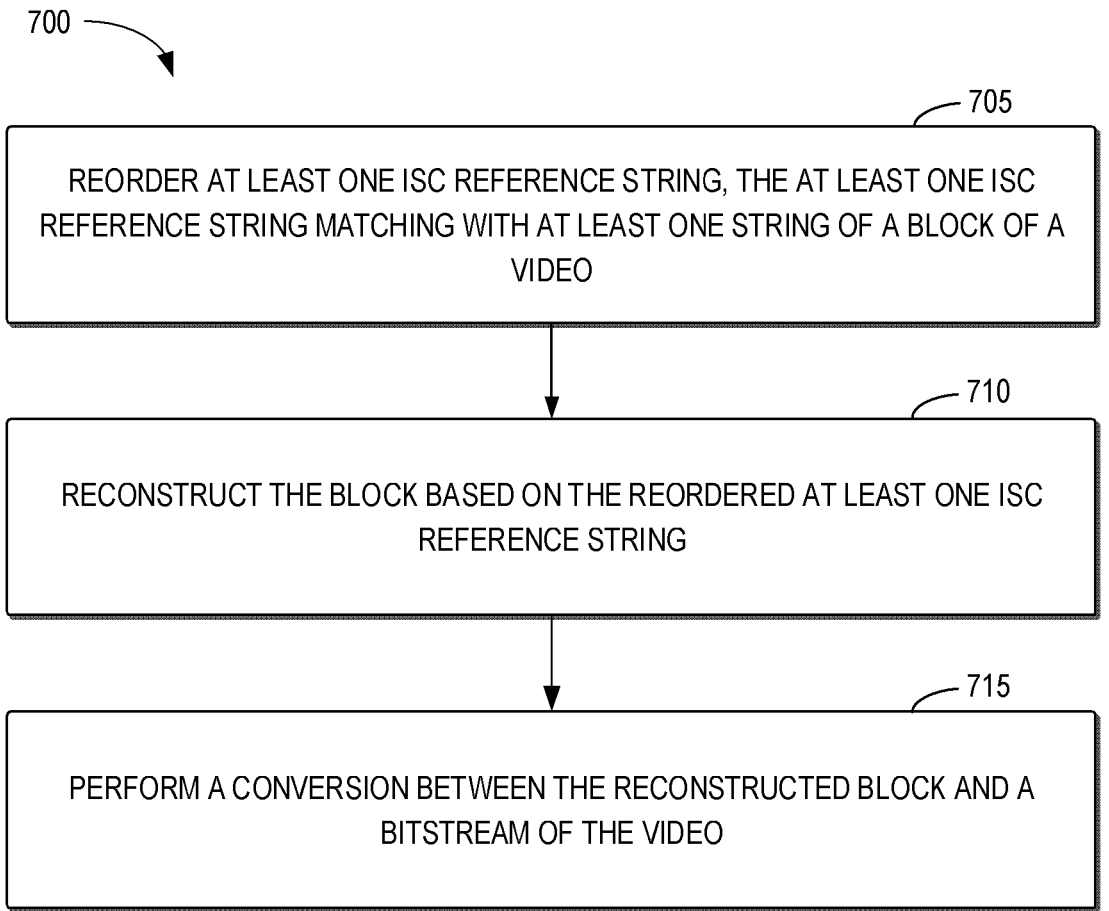
FIG. 7 illustrates a flowchart of a method for video processing in accordance with some embodiments of the present disclosure.

FIG. 7 illustrates a flowchart of a method 700 for video processing in accordance with some embodiments of the present disclosure.

As shown in FIG. 7, at 705, at least one ISC reference string is reordered (or rearranged). The at least one ISC reference string matches with at least one string of a block of a video. At 710, the block is reconstructed based on the reordered at least one ISC reference string. At 715, a conversion is performed between the reconstructed block and a bitstream of the video. In the context of the present disclosure, the reordering of the ISC reference string will be referred to as reordered ISC (RISC).

According to some embodiments of the present disclosure, after the string prediction, the resulting ISC reference string is further reordered. As mentioned above, symmetry occurs more and more often in screen-content pictures since many text characters and computer-generated graphics are symmetric. The reordering of the ISC reference string may avoid redundant processing of a pattern and its symmetric pattern independently. As such, the video coding may be more efficient, and thus the SCC performance may be improved.

In some embodiments, the at least one ISC reference string may be reordered by reordering samples of one of the at least one ISC reference string. For example, after an ISC reference string is obtained by searching in a predetermined searching range to match with a string of the block, the samples of the ISC reference string may be reordered. If the ISC reference string is denoted as S(i) with $0<=i<L$ (L represents any suitable positive integer), the reordered ISC reference string may be denoted as S(f(i)) where f( ) is used to map a first index from 0 to L−1 to a different second index from 0 to L−1.

In some embodiments, the at least one ISC reference string may be reordered by horizontally or vertically flipping a plurality of samples of the at least one ISC reference string. As shown in FIG. 6, in the horizontal flipping, the samples of the five strings of the block are horizontally flipped. In the vertical flipping, the samples of the five strings of the block are vertically flipped. In the context of the present disclosure, such horizontal or vertical flipping of the ISC reference string will be referred to as symmetric ISC (SISC). In this way, a pattern and its symmetric pattern in the video may not be processed independently and redundantly, which is more effective or efficient in the video processing.

In some embodiments, the at least one ISC reference string to be reordered may be obtained based on components and/or formats of the block. In some embodiments, at least one ISC reference string matching with at least one string of one or more components or even all the components of the block may be reordered. As an example, the ISC reference string corresponding to a first component (such as luma) of the block may be reordered while normal intra prediction is always used for a second component (such as Cb or Cr) of the block. As another example, the ISC reference strings to be reordered may correspond to all color components of the block. Such selection of the ISC reference string to be reordered is more flexible and efficient.

In some embodiments, it may be determined, based on dimensions of the block, that a type of reordering is to be performed on the at least one ISC reference string. For example, the type of reordering may be determined to be performed if a condition associated with at least one of the width or the height of the block is met. The condition may comprise a width of the block being within a first range, a height of the block being within a second range, a minimum of the width and the height of the block being within a third range, a maximum of the width and the height of the block being within a fourth range, or a product of the width and the height of the block being within a fifth range.

As an example, it may be determined that RISC or SISC is applicable, if $W>=T1$ and $H>=T2$ where T1=T2=4, if $W<=T1$ and $H<=T2$ where T1=T2=32, if $max(W, H)<=T1$ where T1=32, if $min(W, H)>=T1$ where T1=4, if $W*H>=T1$ where T1=16, or if $W*H<=T1$ where T1=1024. It should be understood that ">=" may be replaced by ">" and "<=" may be replaced by "<". It should also be understood that the specific values recited here is only for the purpose of illustration without suggesting any limitation to the scope of the present disclosure. Thus, the reordering of the ISC reference string may fit in the dimensions of the block, thereby further improving the efficiency of video coding.

Figure 8:
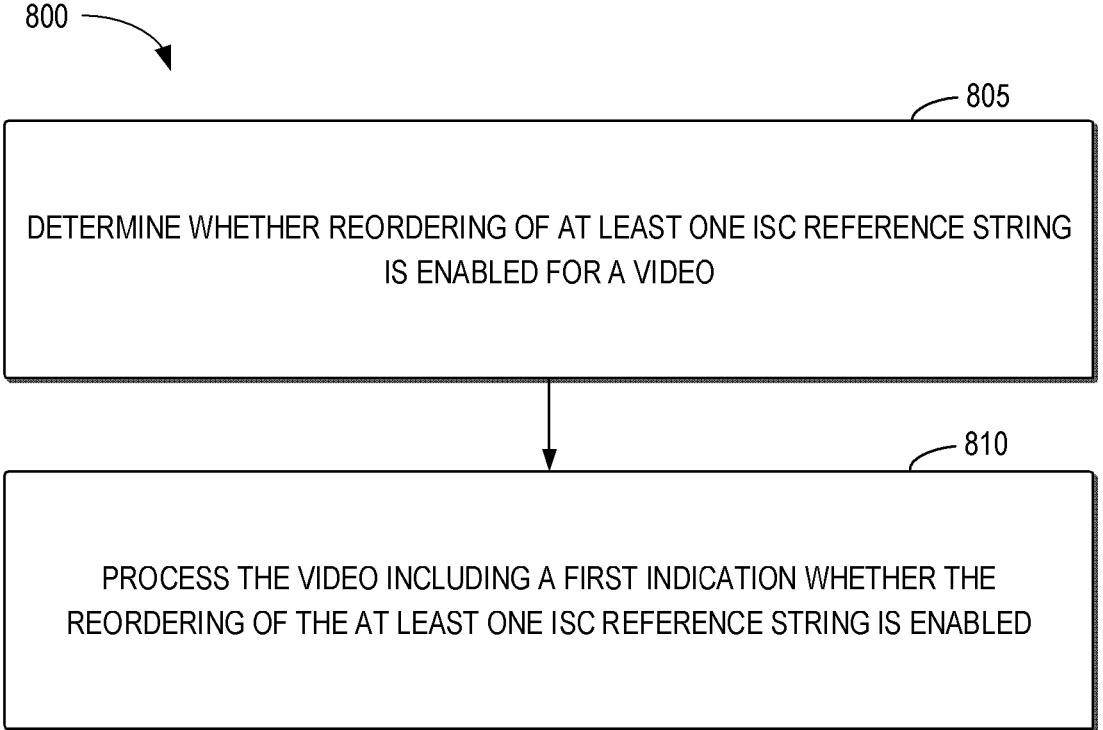
FIG. 8 illustrates a flowchart of another method for video processing in accordance with some other embodiments of the present disclosure.

FIG. 8 illustrates a flowchart of another method 800 for video processing in accordance with some other embodiments of the present disclosure.

As shown in FIG. 8, at 805, it is determined whether reordering of at least one ISC reference string is enabled for a video. At 810, the video is processed which includes a first indication whether the reordering of the at least one ISC reference string is enabled.

According to some embodiments of the present disclosure, the reordering of the resulting ISC reference string can be enabled in video processing. As such, the video processing may be simplified, thereby improving the efficiency of the video coding.

In some embodiments, the first indication may be included in at least one of a sequence parameter set (SPS), a sequence header, a picture parameter set (PPS), a picture header or a slice header of the video. In the case that the reordering of the at least one ISC reference string is applied for a block of the video, the first indication may be included in a high level unit containing the block, such as in a SPS, sequence header, PPS, picture header, and/or slice header.

For the purpose of illustration, the first indication may be represented by risc_enable_flag or sisc_enable_flag. If risc_enable_flag or sisc_enable_flag equals to 1, it is indicated that the reordering of the at least one ISC reference string is enabled, and vice versa. It should be understood that it is only illustrative but not limited that the value "1" is used to indicate the enabling of the reordering of the at least one ISC reference string. In some embodiments, the value "0" of risc_enable_flag or sisc_enable_flag may indicate the enabling of the reordering.

In some embodiments, the first indication may be included in a sequence header of a sequence of the video to indicate that the reordering of the at least one ISC reference string is enabled for the sequence. In some embodiments, the first indication may be included in the sequence header of the sequence if ISC is allowed to be used for the sequence. Thus, it may be avoided to signal the first indication unnecessarily, thereby improving the coding efficiency.

In some embodiments, a second indication may be included in the video to indicate whether the reordering of the at least one ISC reference string is applied for a block of the video. For example, it may be determined whether the second indication is signaled. If it is determined that the second indication is signaled, the second indication may be included in the video. For the purpose of illustration, the first indication may be represented by RISC_flag or SISC_flag.

In some embodiments, if a value of the second indication is a default value, it may be determined that the second indication is absent. For example, RISC_flag or SISC_flag may be inferred to be a default value (such as 0) if it is not present in the bitstream of the video.

In some embodiments, it may be determined that the second indication is signaled if ISC is used for the block. Alternatively, or in addition, if the reordering of the at least one ISC reference string is allowed to be used for the block. For example, if the high level unit containing the block indicates that RISC or SISC is allowed to be used, the the second indication may be signaled. Alternatively, or in addition, if it is determined that the reordering of the at least one ISC reference string is inapplicable for the block, the second indication may be absent or not signaled. As such, unnecessary signaling may be avoided to further improve the coding efficiency.

In some embodiments, the second indication may be signaled based on dimensions of the block. For example, if a condition associated with at least one of the width or the height of the block is met, it may be determined that the second indication is signaled. As an example, the second indication may be signaled, if W>=T1 and H>=T2 where T1=T2=4, if W<=T1 and H<=T2 where T1=T2=32, if max(W, H)<=T1 where T1=32, if min(W, H)>=T1 where T1=4, if W*H>=T1 where T1=16, or if W*H<=T1 where T1=1024. It should be understood that ">=" may be replaced by ">" and "<=" may be replaced by "<". It should also be understood that the specific values recited here is only for the purpose of illustration without suggesting any limitation to the scope of the present disclosure. Thus, unnecessary signaling of the second indication may be further reduced.

In some embodiments, the second indication is carried by a first syntax element for the block, in the video. For the purpose of illustration, the first syntax element may be denoted as RISC_flag to indicate whether RISC is applied for the block.

In some embodiments, a second syntax element for the block is included in the video to indicate a type of the reordering of the at least one ISC reference string. For example, the second syntax element may be denoted as x_element, which may be signaled after RISC_flag for the block to indicate the reordering type or reordering method.

In the embodiments where the horizontal or vertical flipping is performed on the at least one ISC reference string to reorder the ISC reference string, the second syntax element may indicate whether the at least one ISC reference string are horizontally or vertically flipped. In this case, the second syntax element may be denoted as sisc_dir_flag while the first syntax element may be denoted as SISC_flag to indicates whether SISC is applied for the block. In some embodiments, if more than one type of the reordering of the at least one ISC reference string is applicable for the block, the second syntax element may be included in the video. For example, if it is determined that only one type (or kind) of SISC is applicable, sisc_dir_flag is not signaled.

In some embodiments, sisc_dir_flag may indicate which type of SISC is applied to all strings of the block. For example, sisc_dir_flag=0 means horizontal SISC is used, and sisc_dir_flag=1 means vertical SISC is used.

In some embodiments, the second syntax element may be included in the video if the first syntax element indicates that the reordering of the at least one ISC reference string is applied for the block. For example, in the embodiments where RISC is used, x_element is signaled if RISC_flag indicates RISC is used. In the embodiments where SISC is used, sisc_dir_flag is signaled only if SISC_flag indicates SISC is used.

In some embodiments, one or more of the first and second syntax elements are coded by arithmetic coding. In some embodiments, at least one of the one or more of the first and second syntax elements may be bypass coded. In some embodiments, at least one of the one or more of the first and second syntax elements may be coded by one or more contexts. The one or more contexts may be associated with at least one of a third syntax element and a fourth syntax element for a neighboring block. The third syntax element indicates whether reordering of at least one ISC reference string is applied for the neighboring block, and the fourth syntax element indicates a type of the reordering of the at least one ISC reference string for the neighboring block.

For example, in the embodiments where RISC is used, x_element and/or RISC_flag may be coded with one or more contexts. The contexts used to code RISC_flag of the current block may depend on RISC_flags of neighboring blocks. The contexts used to code x_element of the current block may depend on x_element of neighboring blocks.

In the embodiments where SISC is used, sisc_dir_flag and/or SISC_flag may be coded with one or more contexts. The contexts used to code SISC_flag of the current block may depend on SISC_flags of neighboring blocks. The contexts used to code sisc_dir_flag of the current block may depend on sisc_dir_flags of neighboring blocks In some embodiments where the at least one ISC reference string comprises a plurality of ISC reference strings matching with a plurality of strings of the block, a set of syntax elements for the plurality of strings of the block may be included in the video to indicate respective types of the reordering of the plurality of ISC reference strings.

For the purpose of illustration, the set of syntax elements may be denoted as sisc_str_flag which may be signaled after a first and a second syntax elements (denoted as SISC_flag and sisc_dir_flag) for a string in the block. The set of syntax elements may be included in the video if the respective types of the reordering of the plurality of ISC reference strings are different. For example, if it is determined that only one type of SISC is applicable to all strings of the block, sisc_str_flag may be not signaled.

In some embodiments, the set of syntax elements may be included in the video if the first syntax element indicates that the reordering of the plurality of ISC reference strings is applied for the block.

In some embodiments, a syntax element of the set of syntax elements may be included in the video to indicate a type of the reordering of an ISC reference string of the plurality of ISC reference strings matching with a target string of the plurality of strings of the block if a fifth syntax element (denoted as sc_match_flag) for the target string indicates that the target string is matched to a reconstructed string. For example, sisc_str_flag is signaled conditioned by isc_match_type. sisc_str_flag may be signaled if isc_match_flag indicates a current string (as the target string) is matched to a reconstructed string, such as a string of reconstruction pixels.

In some embodiments, the set of syntax elements may be coded by arithmetic coding. In some embodiments, at least one syntax element of the set of syntax elements may be bypass coded. In some embodiments, at least one syntax element of the set of syntax elements may be coded by one or more contexts. The one or more contexts may be associated with a further set of syntax elements for a neighboring block, and the further set of syntax elements indicates respective types of reordering of a plurality of ISC reference strings for the neighboring block.

In this way, the information on whether and/or how to reorder one or more ISC reference string may be coded into the bitstream of the video while signaling of unnecessary information may be reduced or even avoided. Thus, the coding efficiency may be significantly improved, and the video processing is more effective and efficient.

Implementations of the present disclosure can be described in view of the following clauses, the features of which can be combined in any reasonable manner.

Clause 1. A method for video processing, comprising: reordering at least one intra string copy (ISC) reference string, the at least one ISC reference string matching with at least one string of a block of a video; reconstructing the block based on the reordered at least one ISC reference string; and performing a conversion between the reconstructed block and a bitstream of the video.

Clause 2. The method of Clause 1, wherein reordering the at least one ISC reference string comprises: reordering samples of one of the at least one ISC reference string.

Clause 3. The method of Clause 1, wherein reordering the at least one ISC reference string comprises: horizontally or vertically flipping a plurality of samples of the at least one ISC reference string.

Clause 4. The method of Clause 1, further comprising: obtaining the at least one ISC reference string based on components and/or formats of the block.

Clause 5. The method of Clause 4, wherein the at least one string of the block comprises at least one string of one or more components of the block, and obtaining the at least one ISC reference string comprises: obtaining the at least one ISC reference string matching with the at least one string of the one or more components of the block.

Clause 6. The method of Clause 1, further comprising: determining, based on dimensions of the block, that a type of reordering is to be performed on the at least one ISC reference string.

Clause 7. The method of Clause 6, wherein the dimensions of the block comprise a width and a height of the block, and determining that the type of reordering is to be performed on the at least one ISC reference string comprises: in response to a condition associated with at least one of the width or the height of the block being met, determining that the type of reordering is to be performed on the at least one ISC reference string, the condition comprising at least one of: a width of the block being within a first range, a height of the block being within a second range, a minimum of the width and the height of the block being within a third range, a maximum of the width and the height of the block being within a fourth range, or a product of the width and the height of the block being within a fifth range.

Clause 8. A method for video processing, comprising: determining whether reordering of at least one intra string copy (ISC) reference string is enabled for a video; and processing the video including a first indication whether the reordering of the at least one ISC reference string is enabled.

Clause 9. The method of Clause 8, wherein the first indication is included in at least one of a sequence parameter set, a sequence header, a picture parameter set, a picture header or a slice header of the video.

Clause 10. The method of Clause 8, wherein the first indication is included in a sequence header of a sequence of the video to indicate that the reordering of the at least one ISC reference string is enabled for the sequence.

Clause 11. The method of Clause 10, wherein the first indication is included in the sequence header of the sequence if ISC is allowed to be used for the sequence.

Clause 12. The method of Clause 8, further comprising: determining whether the reordering of the at least one ISC reference string is applied for a block of the video; determining whether a second indication is signaled to indicate whether the reordering of the at least one ISC reference string is applied for the block; and in accordance with a determination that the second indication is signaled, determining that the second indication is included in the video.

Clause 13. The method of Clause 12, wherein determining whether the second indication is signaled comprises: in response to a value of the second indication being a default value, determining that the second indication is absent.

Clause 14. The method of Clause 12, wherein determining whether the second indication is signaled comprises: in response to ISC being used for the block, determining that the second indication is signaled.

Clause 15. The method of Clause 12, wherein determining whether the second indication is signaled comprises: determining whether the reordering of the at least one ISC reference string being allowed to be used for the block; and in accordance with a determination that the reordering of the at least one ISC reference string is allowed, determining that the second indication is signaled.

Clause 16. The method of Clause 15, wherein determining whether the second indication is signaled comprises: in accordance with a determination that the reordering of the at least one ISC reference string is inapplicable for the block, determining that the second indication is absent.

Clause 17. The method of Clause 12, wherein determining whether the second indication is signaled comprises: determining, based on dimensions of the block, whether the second indication is signaled.

Clause 18. The method of Clause 17, wherein the dimensions of the block comprise a width and a height of the block, and determining whether the second indication is signaled comprises: in response to a condition associated with at least one of the width or the height of the block being met, determining that the second indication is signaled, the condition comprising at least one of: a width of the block being within a first range, a height of the block being within a second range, a minimum of the width and the height of the block being within a third range, a maximum of the width and the height of the block being within a fourth range, or a product of the width and the height of the block being within a fifth range.

Clause 19. The method of Clause 12, wherein the second indication is carried by a first syntax element for the block, in the video.

Clause 20. The method of Clause 19, wherein a second syntax element for the block is included in the video to indicate a type of the reordering of the at least one ISC reference string.

Clause 21. The method of Clause 20, wherein the reordering of the at least one ISC reference string for the block comprises horizontally or vertically flipping of the at least one ISC reference string, and the second syntax element for the block indicates whether the at least one ISC reference string are horizontally or vertically flipped.

Clause 22. The method of Clause 21, wherein the second syntax element is included in the video if more than one type of the reordering of the at least one ISC reference string is applicable for the block.

Clause 23. The method Clause 20, wherein the second syntax element is included in the video if the first syntax element indicates that the reordering of the at least one ISC reference string is applied for the block.

Clause 24. The method of any of Clauses 20-23, wherein one or more of the first and second syntax elements are coded by arithmetic coding.

Clause 25. The method of Clause 24, wherein at least one of the one or more of the first and second syntax elements is bypass coded.

Clause 26. The method of Clause 24, wherein at least one of the one or more of the first and second syntax elements are coded by one or more contexts.

Clause 27. The method of Clause 26, wherein the one or more contexts are associated with at least one of a third syntax element and a fourth syntax element for a neighboring block, the third syntax element indicates whether reordering of at least one ISC reference string is applied for the neighboring block, and the fourth syntax element indicates a type of the reordering of the at least one ISC reference string for the neighboring block.

Clause 28. The method of Clause 21, wherein the at least one ISC reference string comprises a plurality of ISC reference strings matching with a plurality of strings of the block, and a set of syntax elements for the plurality of strings of the block is included in the video to indicate respective types of the reordering of the plurality of ISC reference strings.

Clause 29. The method of Clause 28, wherein the set of syntax elements is included in the video if the respective types of the reordering of the plurality of ISC reference strings are different.

Clause 30. The method of Clause 28, wherein the set of syntax elements is included in the video if the first syntax element indicates that the reordering of the plurality of ISC reference strings is applied for the block.

Clause 31. The method of any of Clauses 28-30, wherein a syntax element of the set of syntax elements is included in the video to indicate a type of the reordering of an ISC reference string of the plurality of ISC reference strings matching with a target string of the plurality of strings of the block if a fifth syntax element for the target string indicates that the target string is matched to a reconstructed string.

Clause 32. The method of any of Clauses 28-30, wherein the set of syntax elements is coded by arithmetic coding.

Clause 33. The method of Clause 32, wherein at least one syntax element of the set of syntax elements is bypass coded.

Clause 34. The method of Clause 32, wherein at least one syntax element of the set of syntax elements is coded by one or more contexts.

Clause 35. The method of Clause 34, wherein the one or more contexts are associated with a further set of syntax elements for a neighboring block, and the further set of syntax elements indicates respective types of reordering of a plurality of ISC reference strings for the neighboring block.

Clause 36. An electronic device, comprising: a processing unit; and a memory coupled to the processing unit and having instructions stored thereon which, when executed by the processing unit, cause the electronic device to perform a method in accordance with any of Clauses 1-7 or Clauses 8-35.

Clause 37. A non-transitory computer-readable storage medium storing instructions that cause a processor to perform a method in accordance with any of Clauses 1-7 or Clauses 8-35.

Clause 38. A non-transitory computer-readable recording medium storing a bitstream of a video which is generated by a method in accordance with any of Clauses 1-7 or Clauses 8-35, wherein the method is performed by a video processing apparatus.

Example Device

Figure 9:
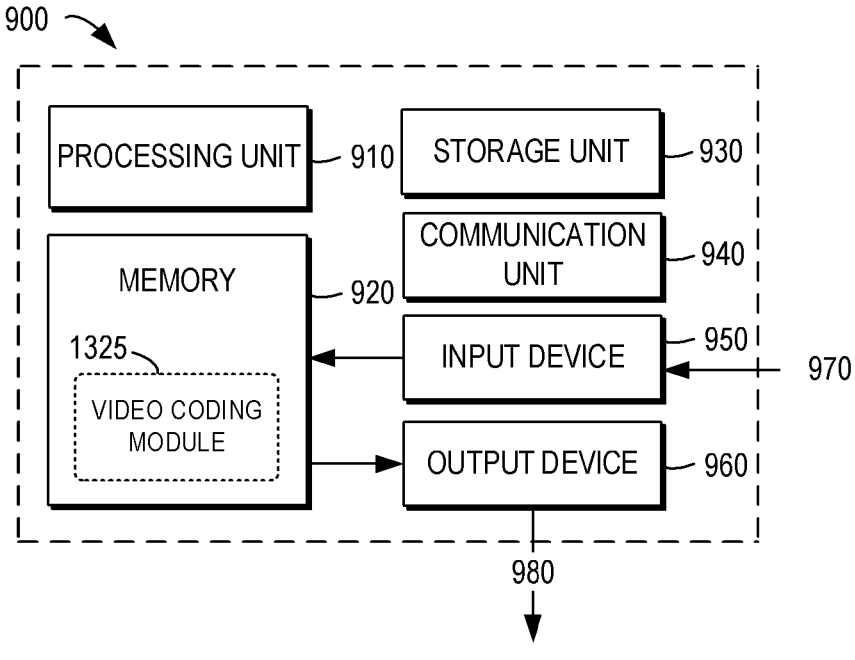
FIG. 9 illustrates a block diagram of a computing device in which various embodiments of the present disclosure can be implemented.

FIG. 9 illustrates a block diagram of a computing device 900 in which various embodiments of the present disclosure can be implemented. The computing device 900 may be implemented as or included in the source device 110 (or the video encoder 114 or 200) or the destination device 120 (or the video decoder 124 or 300).

It would be appreciated that the computing device 900 shown in FIG. 9 is merely for purpose of illustration, without suggesting any limitation to the functions and scopes of the embodiments of the present disclosure in any manner.

As shown in FIG. 9, the computing device 900 includes a general-purpose computing device 900. The computing device 900 may at least comprise one or more processors or processing units 910, a memory 920, a storage unit 930, one or more communication units 940, one or more input devices 950, and one or more output devices 960.

In some embodiments, the computing device 900 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 900 can support any type of interface to a user (such as "wearable" circuitry and the like).

The processing unit 910 may be a physical or virtual processor and can implement various processes based on programs stored in the memory 920. In a multi-processor system, multiple processing units execute computer executable instructions in parallel so as to improve the parallel processing capability of the computing device 900. The processing unit 910 may also be referred to as a central processing unit (CPU), a microprocessor, a controller or a microcontroller.

The computing device 900 typically includes various computer storage medium. Such medium can be any medium accessible by the computing device 900, including, but not limited to, volatile and non-volatile medium, or detachable and non-detachable medium. The memory 920 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 930 may be any detachable or non-detachable medium and may include a machine-readable medium such as a memory, flash memory drive, magnetic disk or another other media, which can be used for storing information and/or data and can be accessed in the computing device 900.

The computing device 900 may further include additional detachable/non-detachable, volatile/non-volatile memory medium. Although not shown in FIG. 9, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 940 communicates with a further computing device via the communication medium. In addition, the functions of the components in the computing device 900 can be implemented by a single computing cluster or multiple computing machines that can communicate via communication connections. Therefore, the computing device 900 can operate in a networked environment using a logical connection with one or more other servers, networked personal computers (PCs) or further general network nodes.

The input device 950 may be one or more of a variety of input devices, such as a mouse, keyboard, tracking ball, voice-input device, and the like. The output device 960 may be one or more of a variety of output devices, such as a display, loudspeaker, printer, and the like. By means of the communication unit 940, the computing device 900 can further communicate with one or more external devices (not shown) such as the storage devices and display device, with one or more devices enabling the user to interact with the computing device 900, or any devices (such as a network card, a modem and the like) enabling the computing device 900 to communicate with one or more other computing devices, if required. Such communication can be performed via input/output (I/O) interfaces (not shown).

In some embodiments, instead of being integrated in a single device, some or all components of the computing device 900 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 900 may be used to implement video encoding/decoding in embodiments of the present disclosure. The memory 920 may include one or more video coding modules 925 having one or more program instructions. These modules are accessible and executable by the processing unit 910 to perform the functionalities of the various embodiments described herein.

In the example embodiments of performing video encoding, the input device 950 may receive video data as an input 970 to be encoded. The video data may be processed, for example, by the video coding module 925, to generate an encoded bitstream. The encoded bitstream may be provided via the output device 960 as an output 980.

In the example embodiments of performing video decoding, the input device 950 may receive an encoded bitstream as the input 970. The encoded bitstream may be processed, for example, by the video coding module 925, to generate decoded video data. The decoded video data may be provided via the output device 960 as the output 980.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:
   reordering, for a conversion between a block of a video and a bitstream of the video, at least one intra string copy (ISC) reference string, the at least one ISC reference string matching with at least one string of the block of the video;
   reconstructing the block based on the reordered at least one ISC reference string; and
   performing the conversion based on the reconstructed block.

2. The method of claim 1, wherein reordering the at least one ISC reference string comprises:
   reordering samples of one of the at least one ISC reference string.

3. The method of claim 1, wherein reordering the at least one ISC reference string comprises:
   horizontally or vertically flipping a plurality of samples of the at least one ISC reference string.

4. The method of claim 1, further comprising:
   obtaining the at least one ISC reference string based on components and/or formats of the block.

5. The method of claim 4, wherein
   the at least one string of the block comprises at least one string of one or more components of the block, and
   obtaining the at least one ISC reference string comprises:
       obtaining the at least one ISC reference string matching with the at least one string of the one or more components of the block.

6. The method of claim 1, further comprising:
   determining, based on dimensions of the block, that a type of reordering is to be performed on the at least one ISC reference string.

7. The method of claim 6, wherein
   the dimensions of the block comprise a width and a height of the block, and
   determining that the type of reordering is to be performed on the at least one ISC reference string comprises:
       in response to a condition associated with at least one of the width or the height of the block being met, determining that the type of reordering is to be performed on the at least one ISC reference string, the condition comprising at least one of:
           a width of the block being within a first range,
           a height of the block being within a second range,
           a minimum of the width and the height of the block being within a third range,
           a maximum of the width and the height of the block being within a fourth range, or a product of the width and the height of the block being within a fifth range.

8. The method of claim 1, wherein the video includes a first indication whether the reordering of the at least one ISC reference string is enabled.

9. The method of claim 8, wherein
the first indication is included in at least one of a sequence parameter set, a sequence header, a picture parameter set, a picture header or a slice header of the video,
the first indication is included in a sequence header of a sequence of the video to indicate that the reordering of the at least one ISC reference string is enabled for the sequence, or
the first indication is included in the sequence header of the sequence if ISC is allowed to be used for the sequence.

10. The method of claim 8, further comprising:
determining whether the reordering of the at least one ISC reference string is applied for a block of the video;
determining whether a second indication is signaled to indicate whether the reordering of the at least one ISC reference string is applied for the block; and
in accordance with a determination that the second indication is signaled, determining that the second indication is included in the video.

11. The method of claim 10, wherein determining whether the second indication is signaled comprises:
in response to a value of the second indication being a default value, determining that the second indication is absent; and/or
determining that the second indication is signaled in response to at least one of:
ISC being used for the block,
the reordering of the at least one ISC reference string being allowed to be used for the block,
the reordering of the at least one ISC reference string being inapplicable for the block, or
a condition associated with at least one of the width or the height of the block being met, the condition comprising at least one of:
a width of the block being within a first range,
a height of the block being within a second range,
a minimum of the width and the height of the block being within a third range,
a maximum of the width and the height of the block being within a fourth range, or
a product of the width and the height of the block being within a fifth range.

12. The method of claim 10, wherein
the second indication is carried by a first syntax element for the block, in the video;
a second syntax element for the block is included in the video to indicate a type of the reordering of the at least one ISC reference string; or
the second syntax element for the block indicates whether the at least one ISC reference string are horizontally or vertically flipped.

13. The method of claim 12, wherein
the second syntax element is included in the video if:
more than one type of the reordering of the at least one ISC reference string is applicable for the block, and/or
the first syntax element indicates that the reordering of the at least one ISC reference string is applied for the block.

14. The method of claim 12, wherein
one or more of the first and second syntax elements are coded by arithmetic coding;
at least one of the one or more of the first and second syntax elements is bypass coded; and/or
at least one of the one or more of the first and second syntax elements are coded by one or more contexts,
the one or more contexts are associated with at least one of a third syntax element and a fourth syntax element for a neighboring block, the third syntax element indicates whether reordering of at least one ISC reference string is applied for the neighboring block, and the fourth syntax element indicates a type of the reordering of the at least one ISC reference string for the neighboring block.

15. The method of claim 12, wherein
the at least one ISC reference string comprises a plurality of ISC reference strings matching with a plurality of strings of the block, and
a set of syntax elements for the plurality of strings of the block is included in the video to indicate respective types of the reordering of the plurality of ISC reference strings.

16. The method of claim 15, wherein
the set of syntax elements is included in the video if:
the respective types of the reordering of the plurality of ISC reference strings are different, and/or
the first syntax element indicates that the reordering of the plurality of ISC reference strings is applied for the block.

17. The method of claim 15, wherein a syntax element of the set of syntax elements is included in the video to indicate a type of the reordering of an ISC reference string of the plurality of ISC reference strings matching with a target string of the plurality of strings of the block if a fifth syntax element for the target string indicates that the target string is matched to a reconstructed string.

18. The method of claim 15, wherein
the set of syntax elements is coded by arithmetic coding;
at least one syntax element of the set of syntax elements is bypass coded; and/or
at least one syntax element of the set of syntax elements is coded by one or more contexts, the one or more contexts are associated with a further set of syntax elements for a neighboring block, and the further set of syntax elements indicates respective types of reordering of a plurality of ISC reference strings for the neighboring block.

19. An electronic device, comprising:
a processing unit; and
a memory coupled to the processing unit and having instructions stored thereon which, when executed by the processing unit, cause the electronic device to:
reorder, for a conversion between a block of a video and a bitstream of the video, at least one intra string copy (ISC) reference string, the at least one ISC reference string matching with at least one string of the block of the video;
reconstruct the block based on the reordered at least one ISC reference string; and
performing the conversion based on the reconstructed block.

20. A non-transitory computer-readable storage medium storing instructions that cause a processor to:
reorder at least one intra string copy (ISC) reference string, the at least one ISC reference string matching with at least one string of a block of a video;

reconstruct the block based on the reordered at least one ISC reference string; and generate a bitstream of the video based on the reconstructed block.

21. The method of claim 1, wherein the conversion includes encoding the video unit into the bitstream, or wherein the conversion includes decoding the video unit from the bitstream.

* * * * *